United States Patent
Bartley et al.

(10) Patent No.: US 9,665,736 B2
(45) Date of Patent: May 30, 2017

(54) AUTHENTICATION USING OPTICALLY SENSED RELATIVE POSITION

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Rochester, MN (US); Mark O. Maxson, Mantorville, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/574,556

(22) Filed: Dec. 18, 2014

(65) Prior Publication Data

US 2017/0039391 A1    Feb. 9, 2017

Related U.S. Application Data

(63) Continuation of application No. 14/570,311, filed on Dec. 15, 2014.

(51) Int. Cl.
| | | |
|---|---|---|
| *G06F 7/04* | (2006.01) | |
| *G06F 17/30* | (2006.01) | |
| *H04N 7/16* | (2011.01) | |
| *G06F 21/64* | (2013.01) | |
| *G06K 9/00* | (2006.01) | |
| *G06K 9/20* | (2006.01) | |

(Continued)

(52) U.S. Cl.
CPC .............. *G06F 21/64* (2013.01); *G06F 21/86* (2013.01); *G06F 21/88* (2013.01); *G06K 9/00771* (2013.01); *G06K 9/20* (2013.01)

(58) Field of Classification Search
CPC ........ G06F 21/60; G06F 21/602; G06F 21/62; G06F 21/70–21/73; G06F 21/78; G06F 21/86–21/88; G06F 2221/2129; G06F 2221/2111; G11C 16/22; H04N 2201/3269
See application file for complete search history.

(56) References Cited

U.S. PATENT DOCUMENTS

| | | | |
|---|---|---|---|
| 7,953,987 B2 | 5/2011 | Buscaglia et al. | |
| 8,395,506 B2 * | 3/2013 | Elledge ................... | G06F 21/88 235/375 |
| 8,639,950 B2 | 1/2014 | Ferris | |

(Continued)

OTHER PUBLICATIONS

Internet Society et al.; "Framework for Establishing a Secure Real-time Transport Protocol (SRTP) Security Context Using Datagram Transport Layer Security (DTLS)"; An IP.com Prior Art Database—Technical Disclosure; May 12, 2010, 75 pages.

(Continued)

*Primary Examiner* — Daniel Potratz

(57) ABSTRACT

Systems and methods to safeguard data and hardware may include a memory configured to store a first image and sensitive data, and an optical sensor configured to capture a second image. A sensor signal comprising the captured second image may be generated. A controller having access to the memory may be configured to receive the sensor signal. The controller may be further configured to compare the stored first image to the captured second image, and based on the comparison, to determine whether the sensitive data is accessed.

5 Claims, 4 Drawing Sheets

Figure 1:
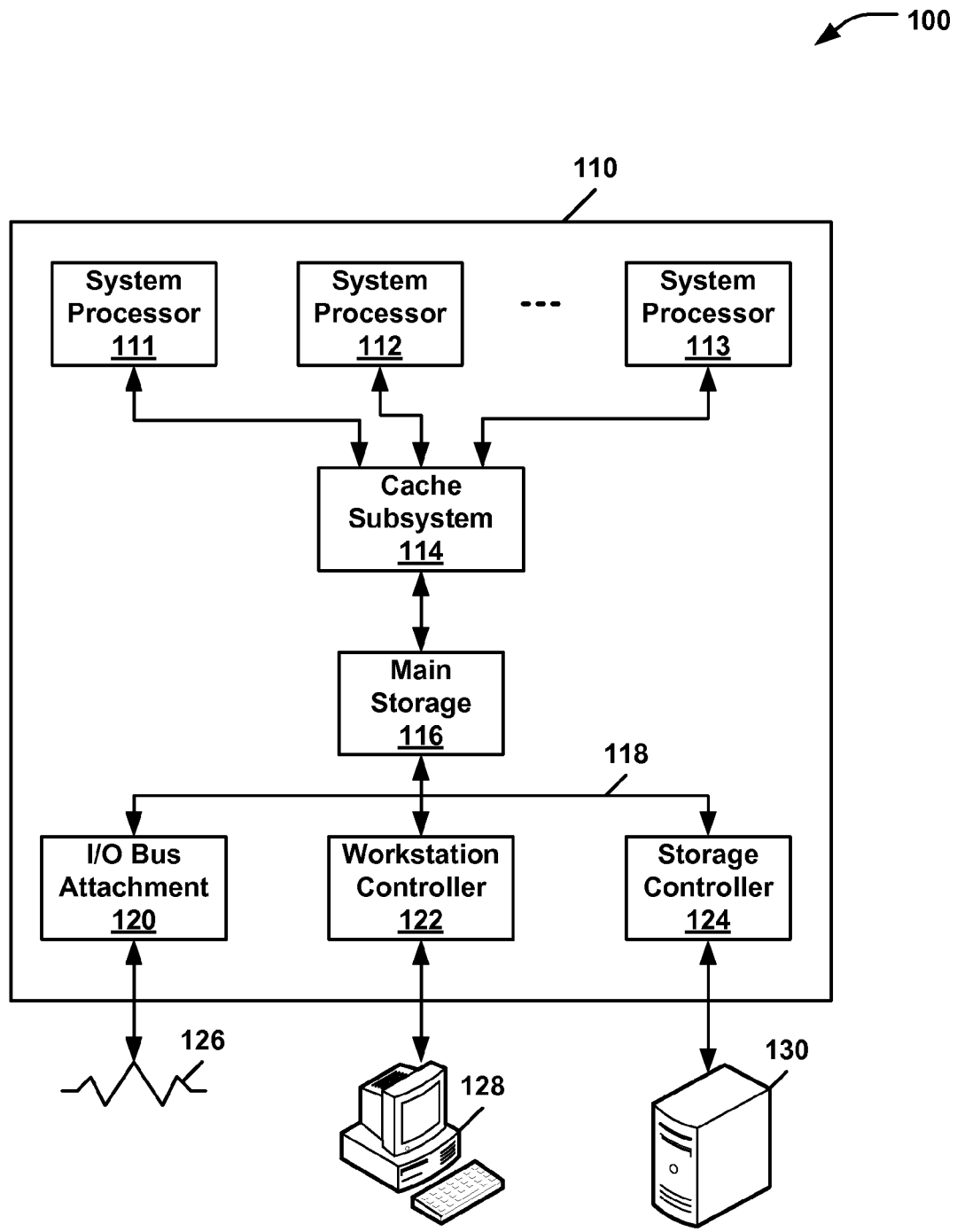

(51) Int. Cl.
*G06F 21/88* (2013.01)
*G06F 21/86* (2013.01)

(56) References Cited

U.S. PATENT DOCUMENTS

| | | | | |
|---|---|---|---|---|
| 2003/0140267 | A1* | 7/2003 | Abbondanzio | G06F 21/86 714/4.1 |
| 2008/0134349 | A1* | 6/2008 | Fleischman | G06F 21/86 726/34 |
| 2010/0024001 | A1* | 1/2010 | Campbell | G06F 21/85 726/2 |
| 2010/0082961 | A1* | 4/2010 | Gurumoorthy | G06F 21/575 713/2 |
| 2011/0031985 | A1* | 2/2011 | Johnson | G06F 21/86 324/681 |
| 2011/0088083 | A1* | 4/2011 | Ficko | G06F 21/34 726/5 |
| 2011/0295908 | A1* | 12/2011 | To | G06F 21/31 707/803 |
| 2013/0207783 | A1* | 8/2013 | Cruzado | H05K 5/0208 340/10.5 |
| 2015/0347259 | A1* | 12/2015 | Katou | G06F 3/048 348/143 |
| 2016/0004867 | A1* | 1/2016 | Gillespie | G06F 21/575 713/2 |

OTHER PUBLICATIONS

Internet Society et al.; "Security Assessment of the Internet Protocol Version 4"; An IP.com Prior Art Database Technical Disclosure; Jul. 6, 2011, 151 pages.

"List of IBM Patents or Patent Applications Treated as Related", Dec. 17, 2014, 1 page.

"What does Bitlocker Measure to Detect a Startup Change?", superuser.com, Dec. 2012, http://superuser.com/questions/523956/what-does-bitlocker-measure-to-detect-a-startup-change, 3 pages.

* cited by examiner

AUTHENTICATION USING OPTICALLY SENSED RELATIVE POSITION

I. CROSS REFERENCE TO RELATED APPLICATIONS

This application is a continuation application and claims priority from U.S. patent application Ser. No. 14/570,311, entitled "AUTHENTICATION USING OPTICALLY SENSED RELATIVE POSITION," filed on Dec. 15, 2014, which is incorporated herein in its entirety.

II. FIELD OF THE DISCLOSURE

The present disclosure relates generally to computing and server technologies, and more particularly, to protecting the circuitry and content of computing devices.

III. BACKGROUND

Protecting sensitive data and technology deployed in the field is an enormous concern in both military and commercial sectors. Although operating hardware is typically housed in guarded facilities, replacement parts may be stocked and transported in a less secure manner. Additional security breaches can occur when unauthorized or unscrupulous personnel gain access inside the secure facility.

IV. SUMMARY OF THE DISCLOSURE

According to an embodiment, an apparatus includes a memory configured to store a first image and sensitive data, and an optical sensor configured to capture a second image. A sensor signal comprising the captured second image may be generated. A controller having access to the memory may be configured to receive the sensor signal. The controller may be further configured to compare the stored first image to the captured second image, and based on the comparison, to determine whether the sensitive data is accessed.

According to another embodiment, a method of safeguarding digital data and hardware includes storing a first image and using an optical sensor to capture a second image. A sensor signal comprising the captured second image may be generated and the stored first image may be compared to the captured second image. Whether the sensitive data should be accessed may be determined based on the comparison.

According to another embodiment, a computer readable storage medium includes instructions that when executed by a processor cause the processor to store a first image and to capture a second image using an optical sensor. A sensor signal comprising the captured second image may be generated and the stored first image may be compared to the captured second image.

Embodiments of the system may safeguard hardware and software that could be compromised by sabotage or theft. Continuous optical monitoring of a physical configuration, or assembly, of blade servers may protect resources by initiating an action to secure sensitive software. The system may provide additional security inside a secure vault that is localized to a server rack. Tolerances may be built into the monitoring software to accommodate jarring from combat situations, turbulence, or rough seas.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

V. BRIEF DESCRIPTION OF THE DRAWINGS

Figure 2:
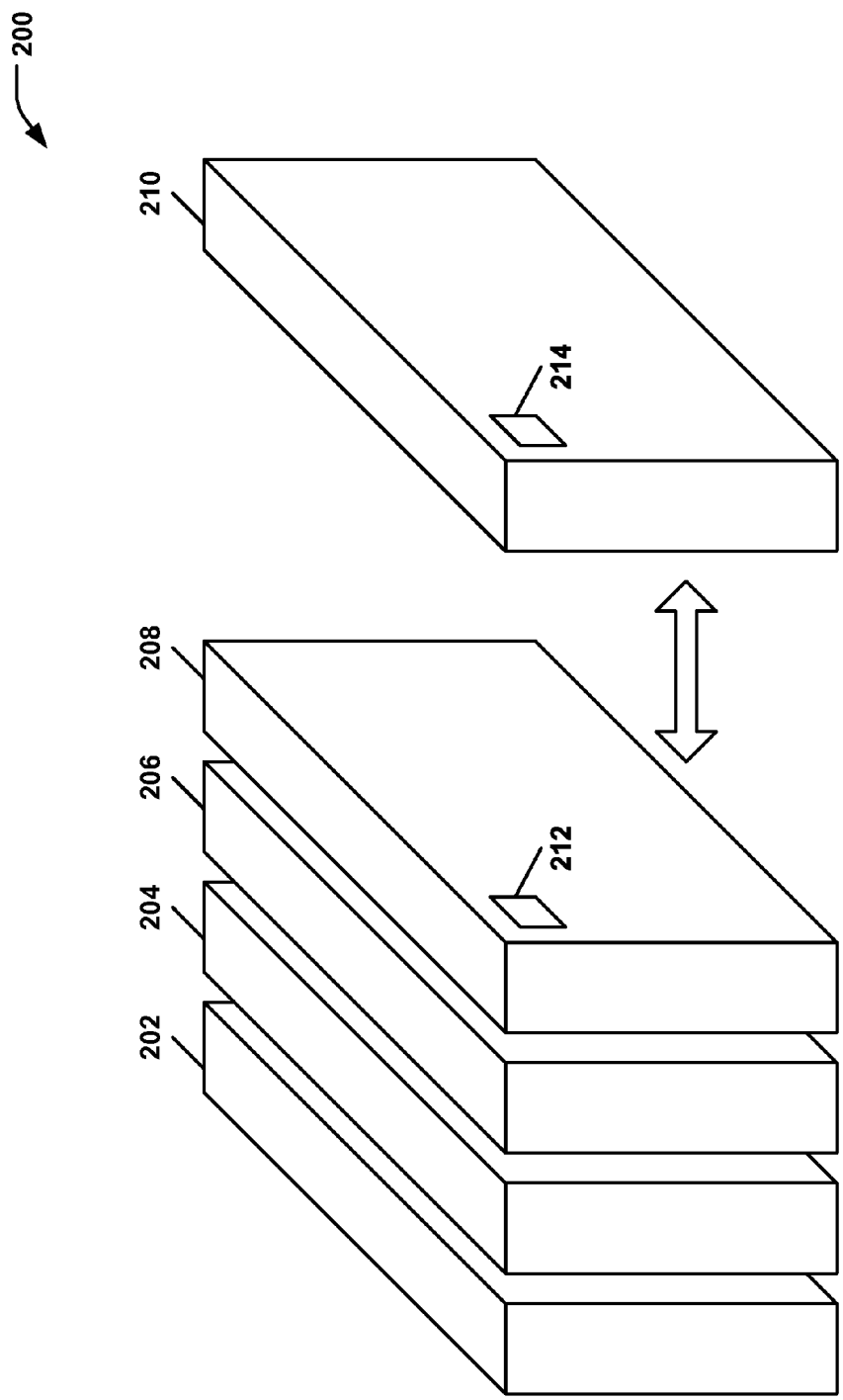
Figure 3:
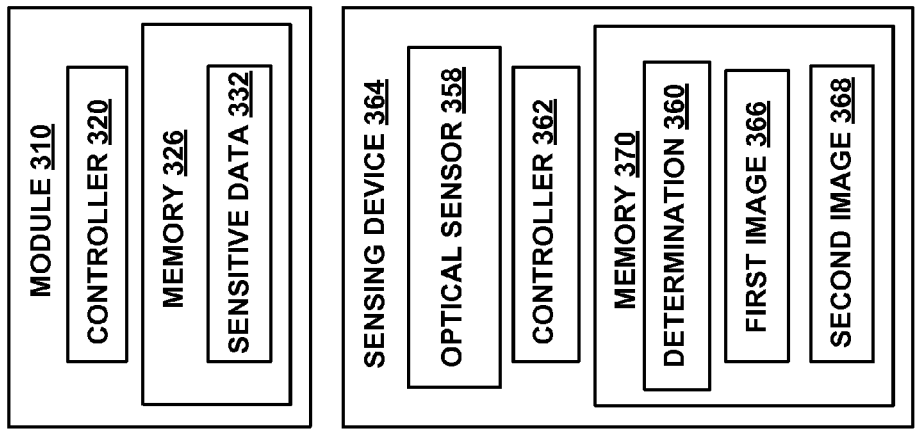
Figure 3:
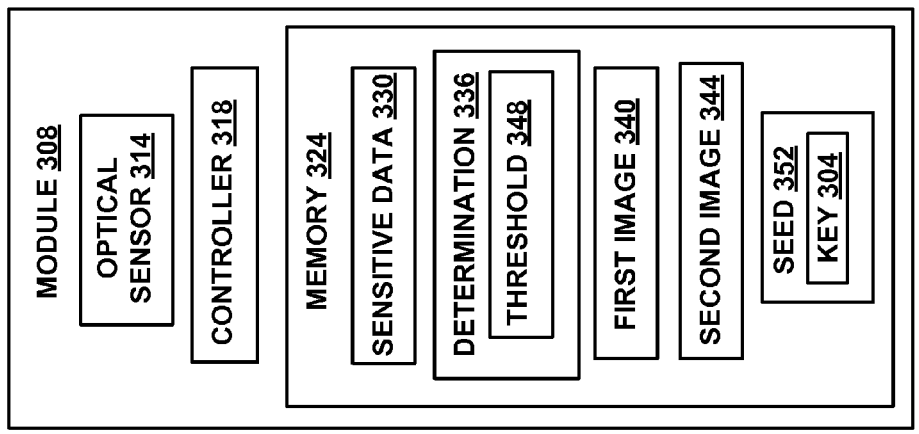
Figure 3:
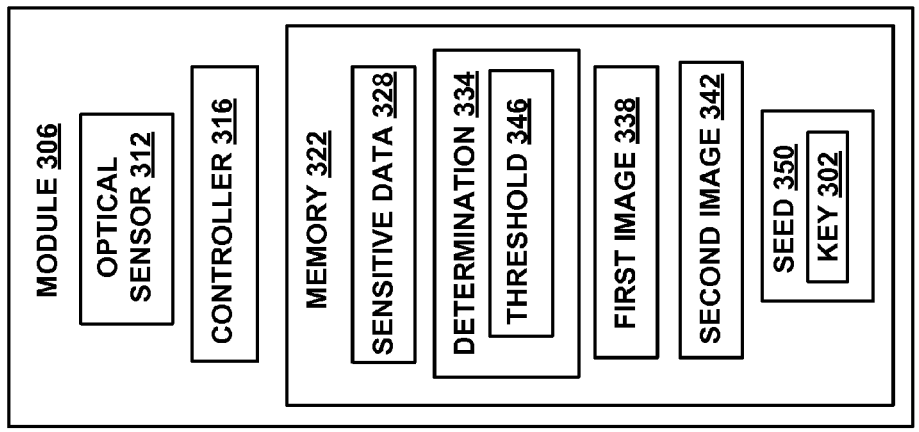
Figure 4:
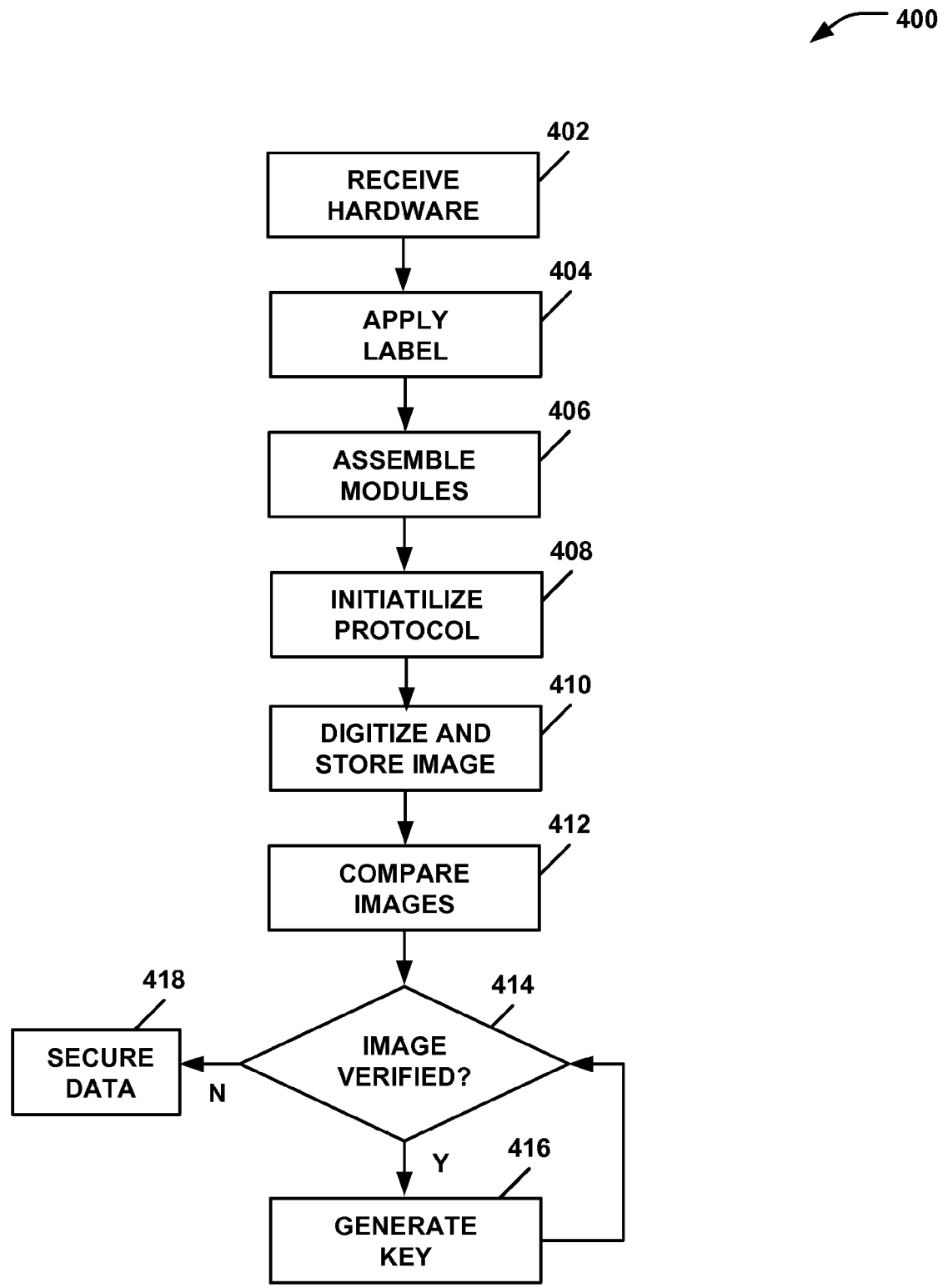

FIG. 1 generally illustrates a data processing apparatus configured to support embodiments to safeguard sensitive data based on images compared using an optical sensor;

FIG. 2 shows an embodiment of blade servers configured to safeguard sensitive data and hardware using an image that includes a label on a neighboring blade server;

FIG. 3 shows an embodiment of a system that more particularly shows computing components used to generated authentication keys after verifying that an image associated with a neighboring computing module matches a stored image; and FIG. 4 is a flowchart of an embodiment of a method of protecting sensitive data and hardware using an optical sensor to capture an image associated with a neighboring blade server and to compare the captured image to a stored image.

VI. DETAILED DESCRIPTION

In aerospace and defense applications, multiple blade servers or other computing modules are often grouped together within a rack style system package. To enable a level of security and tamper evident capability, these modules may recognize their proximity and relative position within the group of modules. If one of the modules are removed from or repositioned within the group, the modules may execute commands to erase or otherwise secure their sensitive content.

An embodiment of a system uses a fingerprint, symbol, or other label comprising part of a perspective snapshot or other image in conjunction with an image recognition capability. The system may verify the appropriate modules are still in their respective and appropriate locations. If the image sensor detects a change in the previously scanned and stored image signature, then sensitive data may be erased or destroyed.

An optical sensor may be used to optically detect an image to ensure that security keys are generated only if an expected system configuration is present. A system of modules, or processing units, may be grouped together with a number of nearly identical modules. Each of these modules may be responsible for generating and sharing a portion of an overall security seed. The seed may be used to generate the final security keys for one or more of the system of modules. In an embodiment, a seed may comprise a short string of byte values. The seed may be transformed into a key using a secret algorithm. The key may be compared to a known key to authenticate. No one module may know the entire security system. The module may only know how to generate a next seed. The generation of the next seed may be initiated by a neighboring module. Thus, the generation of a seed and/or a key may be based upon a verification of an image of one or more of the modules.

An image may be positioned in an appropriate position to interface with an image sensor. The image may be positioned on a surface of a blade server that is assembled along with other blade servers. At startup, the image(s) may be read and encoded into each respective blade server. The optical sensor and a controller may continuously monitor the image. Should any changes be detected, the blade server may execute an erase protocol.

The erase protocol may also be initiated when a blade server is powered on without a neighboring or paired blade server. Similarly, access to secure information may be interrupted when a blade server is removed. For instance, when a blade server loses contact with an image.

A tolerance may be included in the determination algorithm to allow a threshold of vibration or movement. For example, the threshold of a ship's system may accommodate expected shifting attributable to movement of the sea. Another threshold may provide enough stability so that the shock and vibration of battle or turbulence does not cause a loss of contact with the image. In a particular embodiment, the threshold of tolerance may be associated with a threat or status condition. For example, a combat condition may increase the tolerance or effectively disable the safeguards.

The optical sensor may include infrared (IR), radio frequency identification (RFID), or ultraviolet (UV) sensing capabilities appropriate to the composition of the image. According to an embodiment, an image could be hand drawn or include a sticker.

An embodiment of a system enables sensitive hardware and software only within an end application secure facility. The system may further provide tamper detection, tamper evidence, and mitigation of sensitive data loss to avoid compromise of the integrity of the secured functions.

Turning more particularly to the drawings, FIG. 1 generally illustrates a data processing apparatus 100 configured to safeguard sensitive data based on images compared using an optical sensor. The apparatus 100 may generally include a computer, a computer system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc. The apparatus 100 may be referred to as a logically partitioned computing system or computing system, but may be referred to as computer for the sake of brevity. One suitable implementation of the computer 110 may be a multi-user computer, such as a computer available from International Business Machines Corporation (IBM).

The computer 110 generally includes one or more physical processors 111, 112, 113 coupled to a memory subsystem including a main storage 116. The main storage 116 may include a flash memory, a hard disk drive, and/or another digital storage medium. The processors 111, 112, 113 may be multithreaded and/or may have multiple cores. A cache subsystem 114 is illustrated as interposed between the processors 111, 112, 113 and the main storage 116. The cache subsystem 114 typically includes one or more levels of data, instruction and/or combination caches, with certain caches either serving individual processors or multiple processors.

The main storage 116 may be coupled to a number of external input/output (I/O) devices via a system bus 118 and a plurality of interface devices, e.g., an I/O bus attachment interface 120, a workstation controller 122, and/or a storage controller 124 that respectively provide external access to one or more external networks 126, one or more workstations 128, and/or one or more storage devices 130, such as a direct access storage device (DASD). The system bus 118 may also be coupled to a user input (not shown) operable by a user of the computer 110 to enter data (i.e., the user input sources may include a mouse, a keyboard, etc.) and a display (not shown) operable to display data from the computer 110 (i.e., the display may be a CRT monitor, an LCD display panel, etc.), and an optical sensor (not shown). The computer 110 may also be configured as a member of a distributed computing environment and communicate with other members of that distributed computing environment through a network 126.

FIG. 2 shows an embodiment of a system of blade servers 202, 204, 206, 208, 210 configured to safeguard sensitive data and hardware using images generated using optical sensors 212, 214. The system 200 may use the optical sensors 212, 214 to capture a perspective snapshot or other image that includes at least a portion of an adjacent or proximate blade server(s). The system 200 may verify the appropriate blade servers are still in their respective and appropriate locations. Sensitive data may be erased or destroyed if the optical sensors 212, 214 detect a change in the previously scanned and stored image signature.

FIG. 3 shows an embodiment of a system 300 that more particularly shows computing components used to generate authentication keys 302, 304 after verifying that an image associated with a neighboring computing module 306, 308, 310 matches a stored image. The modules 306, 308, 310 of an embodiment may comprise blade servers, such as are shown in FIG. 2.

The modules 306, 308 may include optical sensors 312, 314 configured to capture an image used to verify the presence and arrangement of surrounding modules. Each module 306, 308, 310 may include a controller 316, 318, 320 and a memory 322, 324, 326. The memory 322, 324, 326 includes sensitive data 328, 330, 332. Memory 322, 324 may further include determination program code 334, 336. The determination program code 334, 336 may be executed to determine whether a first image 338, 340 matches a second image 342, 344 within bounds of a threshold 346, 348. According to an embodiment, the first image 338, 340 and the second image 342, 344 may be captured by the optical sensors 312, 314.

A seed 350, 352 may be used to generate the key 302, 304 in response to an acceptable match. More particularly, each of these modules 306, 308, 310 may be responsible for generating and sharing a portion of an overall security seed 350, 352. The seed 350, 352 may be used to generate the final security keys 302, 304 for one or more of the system of modules 306, 308, 310. In an embodiment, a seed 350, 352 may comprise a short string of byte values. The seed 350, 352 may be transformed into a key 302, 304 using a secret algorithm. The key 302, 304 may be compared to a known key to authenticate. No one module 306, 308, 310 may know the entire security system 300. The module 306, 308, 310 may only know how to generate a next seed 350, 352. The generation of the next seed 350, 352 may be initiated by a neighboring module 306, 308, 310. Thus, the generation of a seed 350, 352 and a key 302, 304 may be based upon a verification of an image of one or more of the modules 306, 308, 310.

According to a particular embodiment, the optical sensor 358 and the determination program code 360 may be executed by a controller 362 of a sensing device 364 that is separate (e.g., remote from or attachable to) the module 310.

FIG. 4 is a flowchart of an embodiment of a method 400 of protecting sensitive data and hardware using an optical sensor to capture an image associated with a neighboring blade server and to compare the captured image to a stored image. The embodiment of the method 400 may be executed by a blade server computing environment, such as the system 200 shown in FIG. 2. As shown in the flowchart, imaging may be performed continuously. If image loss is determined and verified, loss prevention actions may be initiated.

Turning more particularly to the flowchart, hardware may be added at 402. For example, a new or replacement blade server may be added to a blade server rack. Where so configured, a label may be added at 404 to the new hardware. In another embodiment, the label may be added at a factory or a waypoint. The label may comprise part of an image captured by an optical sensor of a neighboring blade server.

The modules may be assembled at 406. For example, blade servers may be positioned within a blade server rack. A security protocol may be initialized at 408. The initialization of the security protocol may include each module may use an optical sensor to capture and to store a first adjacent image.

At 410, a second image may be captured and digitally stored. The first and second images may be compared at 412 to verify the relative position of the module. Verification may include matching the images within a predetermined threshold. The threshold may be selectable based on a condition, such as a combat or at sea setting, when interruptions in image verification may be expected or unacceptable. Verification may include multiple image samplings and comparisons. The determination program code may use an average image intensity rather than a specific pixel content. According to a particular embodiment, only an internal portion of an image (e.g., a label affixed to a neighboring blade server) may be checked.

When the image is verified at 414, a key may be generated at 416, and operation of the module may proceed as the image is continuously monitored. When the image alternatively cannot be verified at 414, a defensive action may be initiated at 418 to secure the data and hardware.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. An apparatus comprising:
 a blade server rack; and
 a plurality of neighboring blade servers specifically positioned within the blade server rack, each neighboring blade server comprising:
  a memory configured to store a first image and sensitive data, wherein the first image comprises an image captured from one of the plurality of neighboring blade servers;
  an optical sensor configured to capture a second image and to generate a sensor signal comprising the captured second image, wherein the second image comprises an image captured from an adjacently positioned neighboring blade server within the blade server rack; and
  a controller having access to the memory and configured to receive the sensor signal, wherein the controller is further configured to compare the stored first image to the captured second image, and based on a successful comparison to initiate the generation of a seed value at the adjacently positioned neighboring blade server, wherein each seed value generated by the plurality of neighboring blade servers is required by a secret algorithm in order to generate a key used to authenticate access to determine the sensitive data.

2. The apparatus of claim 1, wherein the first image is captured using the optical sensor at system startup.

3. The apparatus of claim 1, wherein the controller continuously compares the stored first image to one of a plurality of captured images.

4. The apparatus of claim 1, wherein the optical sensor uses at least one of infrared, radio, and ultraviolet frequencies.

5. The apparatus of claim 1, further comprising a label that is positioned in view of the optical sensor and that is included in the stored first image.

* * * * *